Figure 1:
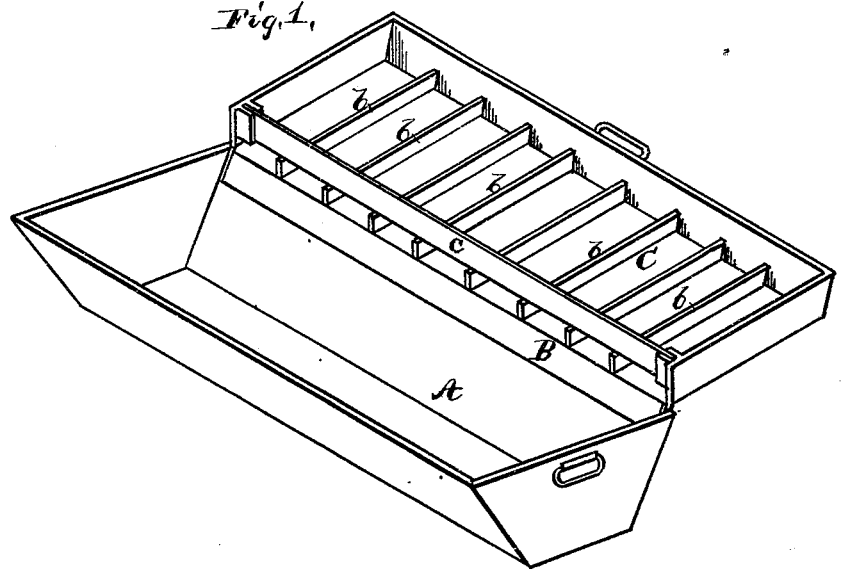
Figure 2:
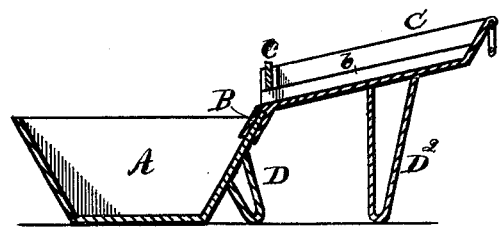

E. S. HARPER, Sr.
DISH CLEANER AND DRAINER.

No. 176,304. Patented April 18, 1876.

WITNESSES:
Jas. F. Duhamel,
Thomas Byrne,

INVENTOR:
E. S. Harper Sr.
PER
H. T. Abbot.
ATTORNEY.

UNITED STATES PATENT OFFICE.

ELIJAH S. HARPER, SR., OF FLORESVILLE, TEXAS.

IMPROVEMENT IN DISH CLEANERS AND DRAINERS.

Specification forming part of Letters Patent No. 176,304, dated April 18, 1876; application filed January 11, 1876.

*To all whom it may concern:*

Be it known that I, ELIJAH S. HARPER, Sr., of Floresville, in the county of Wilson and State of Texas, have invented certain new and useful Improvements in Dish-Pan Drainers, of which the following is a specification:

The object of this invention is to provide a convenient and cheap article of household ware for washing dishes, glassware, and similar articles of household use.

To this end, therefore, this invention consists of a dish-pan, A, as shown in the drawing, forming part of this specification. Said pan, of suitable size and shape, is made of tin or other suitable metal, at one side of which is attached, by an elongated socket of sheet metal, B, another pan or shallow tray, C. Instead of the socket B a hinge may unite the pan A and the tray C. At the bottom of the tray C are soldered, or otherwise secured, a number of bars, *b*, at convenient distances apart, to which bars the dishes or other articles, after being washed in the pan A, are transferred, and upon which said articles are left to drain. The tray C is provided with a rim or strip of metal, *c*, above the bars *b*, and near the socket B, in order to prevent the dishes from sliding out of the tray C, which tray should have such an inclination as to cause all the water drained from the dishes to run back into the pan A. The rear side of the pan A and the back of the tray C are each provided with legs D $D^2$ to steady the whole apparatus.

Having thus fully described this invention, I claim—

A dish-pan drainer, consisting of the pan A and tray C, detachably united at an obtuse angle, and provided with the bars *b*, rim *c*, and legs D $D^2$, all substantially in the manner hereinbefore described, for the purposes set forth.

In testimony that I claim the foregoing as my own, I affix my signature in presence of two witnesses.

ELIJAH S. HARPER, SR.

Witnesses:
A. G. PICKETT,
W. L. WORSHAM.